(12) United States Patent
Ihara et al.

(10) Patent No.: US 6,447,698 B1
(45) Date of Patent: *Sep. 10, 2002

(54) METHOD FOR PRODUCING LIGHT-EMITTING SUBSTANCE

(75) Inventors: Masaru Ihara; Igarashi Takahiro; Tsuneo Kusunoki, all of Kanagawa; Katsutoshi Ohno; Mamoru Senna, both of Tokyo; Tetsuhiko Isobe; Miho Konishi, both of Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/398,753

(22) Filed: Sep. 17, 1999

(30) Foreign Application Priority Data

Sep. 28, 1998 (JP) ............................................. P10273596

(51) Int. Cl.[7] ................................................ C09K 11/02
(52) U.S. Cl. ................................................. 252/301.36
(58) Field of Search ...................... 252/301.4 R, 301.65, 252/301.36

(56) References Cited

U.S. PATENT DOCUMENTS 5,455,489 A * 10/1995 Bhargava ................. 313/169.4
6,117,363 A * 9/2000 Ihara et al. ............. 252/301.36

* cited by examiner

*Primary Examiner*—C. Melissa Koslow
(74) *Attorney, Agent, or Firm*—Sonnenschein, Nath & Rosenthal

(57) ABSTRACT

A manufacturing method for a nanocrystal light emission substance having a nano structure crystal, doped with an activator and cured with ultraviolet light. The nanocrystal light emission substance is synthesized by a liquid phase co-precipitation process. During the liquid phase reaction, an organic acid, such as acrylic acid or methacrylic acid, is added. Alternatively, a high molecular organic acid, such as polyacrylic or polymethacrylic acid, polystyrene, is added after the liquid phase reaction. The resulting substance is then cured with ultraviolet light.

7 Claims, 5 Drawing Sheets

METHOD FOR PRODUCING LIGHT-EMITTING SUBSTANCE

BACKGROUND OF THE INVENTION

1. Field of the Invention

This invention relates to a light-emitting substance and a manufacturing method thereof. More particularly, it relates to a method for manufacturing a so-called nanocrystal light-emitting substance.

2. Description of the Related Art

Recently, the nano crystal structure in II–VI group semiconductors, such as ultra-fine particles or porous silicon, typified by Si or Ge, is stirring up notice in that the crystal exhibits peculiar optical properties. The nano crystal structure means crystal grains having the crystal size of the order of a few nanometers and is usually known as nanocrystals.

If, in the II–VI group semiconductors, the above-mentioned nano structure crystal and the bulk structure crystal are compared to each other, the former exhibits more desirable light absorbing and emitting characteristics. This is presumably ascribable to the fact that the II–VI group semiconductors having the nano structure crystal has a band gap larger than that in the bulk crystal structure because of the quantum size effect. That is, in the II–VI group semiconductors having the nano structure crystal, the band gap is retained to be increased due to the quantum size effect.

Meanwhile, a variety of light emitting substances are used in a display, such as a television display. The light emitting substance, currently used in a display, such as television display, is synthesized by firing the starting material at an elevated temperature. The synthesized light emitting substance has a particle size of the order of micrometers (3 to 10 μm).

On the other hand, there is recently raised a demand for a thin type display in the field of e.g., television. Thus, a plasma display as a lightweight flat display, termed herein a PDP, a field emission display, termed herein a FED, or an electroluminescence display, termed herein an ELD, is stirring up notice.

Of these, the FED is attracting utmost notice. With the FED, the electron beam voltage is much lower than that of e.g., the CRT. Thus, if the conventional light emitting substance, having the grain size of the order of a few um, there is raised a problem that sufficient light emission cannot be achieved because of the extremely low voltage of the electron beam. The reason is possibly that the irradiated electron beam cannot reach the light-emitting site of the light emitting substance because of the large-sized structural crystals of the conventional light emitting substance.

It may, therefore, be said that a light emitting substance that can be excited at a lower voltage is suited for the thin type display, in particular the FED. The II–VI group semiconductors, having the above-described nano structure crystal, may be recited as the light emitting substance satisfying this requirement.

On the other hand, zinc oxide, represented herein as ZnO:Zn, emitting green to blue light, may be recited as being a light emitting substance emitting the light at a lower voltage. Specifically, this ZnO:Zn is used in the FED and can be excited at a voltage as low as hundreds to thousands volts. This ZnO:Zn has a crystal structure of a micro size and exhibits electrically conductivity such that it can emit light without charge-up even at a lower voltage.

With a light emitting substance having the nano structure crystal, even the electron beam radiated at a lower voltage can reach the light emitting site of the light emitting substance. Thus, the light emitting substance having the nano structure crystal can be used with advantage for the above-described thin-type display.

However, at present, there is no practically utilized light emitting substance that can be excited at a low voltage, with the exception of the above-mentioned ZnO:Zn. The manufacturing method for the II–VI group semiconductors, having the nano structure crystal, has not been sufficiently investigated, such that no desirable light emitting substance can be manufactured. Thus, a manufacturing method for a light emitting substance usable advantage for the type display has been a desideratum.

There is also raised a demand for a fine light emitting substance for ultra-high definition CRT or a light emitting substance of high light emitting efficiency emitting the light by ultraviolet light for ELD. Thus, a new method for manufacturing this light emitting substance has also been a desideratum.

SUMMARY OF THE INVENTION

It is therefore an object of the present invention to provide a novel manufacturing method for a light emitting substance of high light emitting efficiency having the nano structure crystal and which is satisfactorily doped with an activator.

In one aspect, the present invention provides a light emission substance formed of a nanocrystal light emission substance, with a mean crystal size of 2 to 5 nm, activated by an activator and irradiated with ultraviolet light.

In another aspect, the present invention provides a method for producing a light emission substance including illuminating the ultraviolet light on a nanocrystal light emission substance of a mean crystal grain size of 2 to 5 nm activated with an activator.

In yet another aspect, the present invention provides a method for manufacturing a color cathode ray tube having at least a portion of a phosphor surface thereof formed by a light emission substance formed of a nanocrystal light emission substance of a mean crystal size of 2 to 5 nm, activated by an activator and irradiated with ultraviolet light.

With the manufacturing method for the light emission substance according to the present invention, there may be produced an ultra-fine nanocrystal light emission substance that is able to be excited to emit light even at a low voltage and that has an extremely high light emitting efficiency.

The nanocrystal light emission substance, prepared by this method, can be applied with advantage to FEDs, high definition CRT or ELD.

DESCRIPTION OF THE PREFERRED EMBODIMENTS

Figure 1:
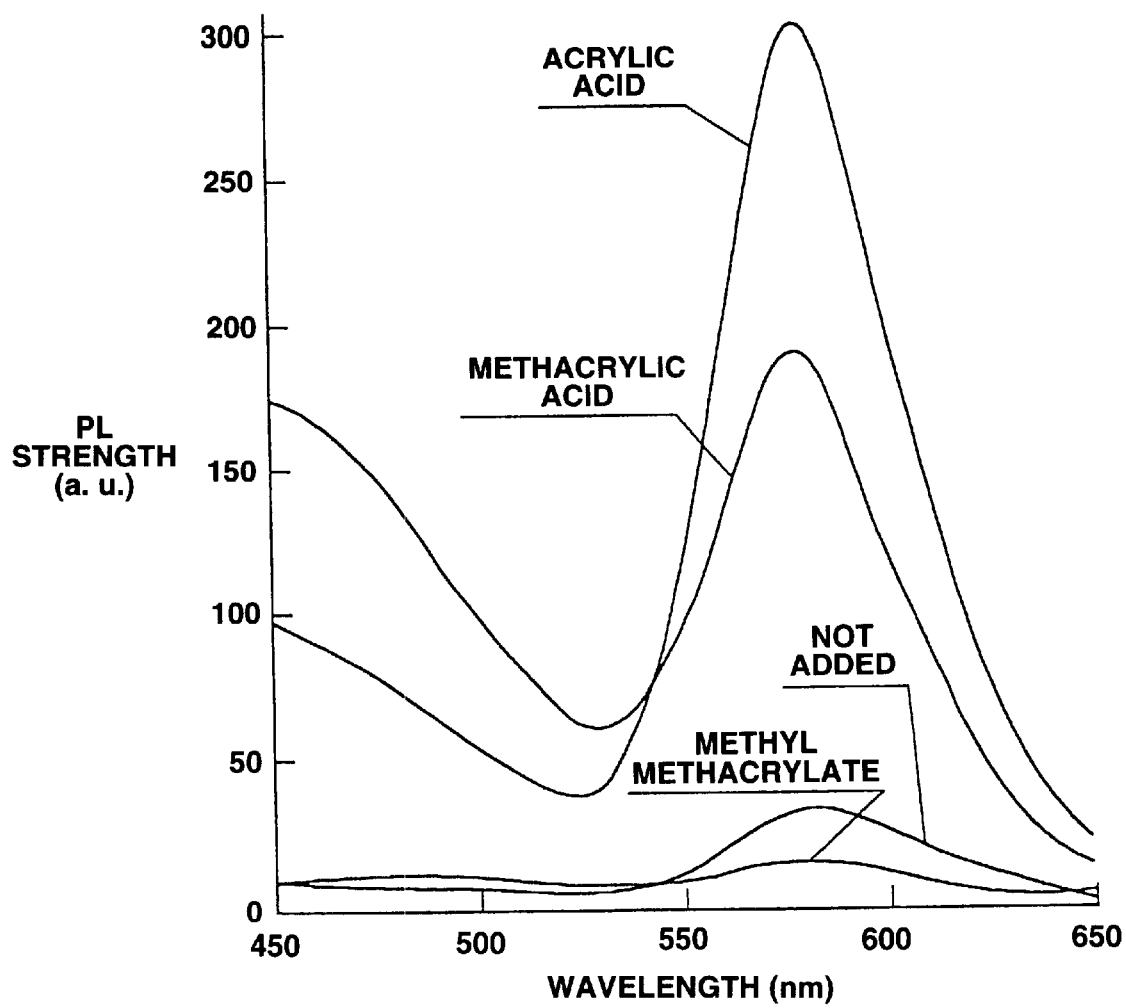
FIG. 1 is a graph showing light emitting characteristics on addition of acrylic or methacrylic acid.

The manufacturing method for a light emitting substance according to the present invention is now explained in detail.

In the manufacturing method for the light emitting substance according to the present invention, a II–VI semiconductor, doped with an activator by the liquid phase co-precipitation process and an organic acid is added during the liquid phase reaction system to synthesize a nanocrystal light emitting substance. Alternatively, a II–VI group semiconductor doped with the activator is formed by the liquid phase co-precipitation process and, after the end of the liquid phase reaction, a high-molecular organic acid or polystyrene is added to synthesize the nanocrystal light emitting substance.

As the II–VI group semiconductors, zinc sulfide (ZnS), cadmium sulfide (CdS) or zinc selenide (ZnSe), for example, may be recited.

As the activator, manganese (Mn), for example, may be recited. If this activator is doped into ZnS, among the II–VI group semiconductors, the light emitting performance proper to the II–VI group semiconductors may be afforded to ZnS. Specifically, Mn exhibits light emission and afterglow of an orange color. Also, if this activator is doped to CdS instead of ZnS, light emission and afterglow shifted to the long wavelength side is exhibited. In the following description, the ZnS semiconductor doped with Mn is indicated "ZnS:Mn".

If copper (Cu), aluminum (Al), silver (Ag) and chlorine (Cl) are doped to ZnS as an activator in combination, the light-emitting performance proper to these elements can be displayed. Specifically, Cu and Al exhibit green light emission and afterglow, while Cu and Cl exhibit green light emission and afterglow. On the other hand, Ag and Al exhibit blue light emission and afterglow, while Ag and Cl exhibit blue light emission and afterglow.

Also, if terbium (Tb), thulium (Tb), europium (Eu) of fluorine (F) is doped to ZnS as an activator, alone or in combination, the light-emitting performance proper to these elements can be displayed. Specifically, Tb or TbF$_3$ exhibits green light emission and afterglow, while Tm or Tm$_3$ exhibits blue light emission and afterglow and Eu or EuF$_3$ exhibits red light emission and afterglow.

In this technique, the liquid phase co-precipitation process is used when doping the activator to the II–VI group semiconductor. The liquid phase co-precipitation process means a reaction in which, when synthesizing the II–VI group semiconductor in a pre-set solvent, a salt having an atom operating as an activator is allowed to co-exist in the reaction system. Meanwhile, the activator to be doped need not be a single atom but may be comprised of plural atoms.

Specifically, the following liquid phase reaction:

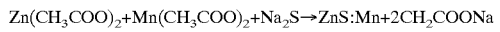

takes place for manufacturing ZnS:Mn using Mn as an activator.

The activator is added as a salt during the liquid phase reaction system. As the salt having an activator atom, there may be recited an acetate or a nitrate, depending on the atom type.

Specifically, if the activator atom is Mn, Ag or Cu, it is preferably added as acetate during the liquid phase reaction. If the activator atom is Al, Th, Tm or Eu, it is preferably added as nitrate during the liquid phase reaction. If Cl is used as an activator, it is preferably added during the liquid phase reaction as compounds exemplified by CuCl or AgCl. Moreover, if F is used as an activator, it is preferably added as a compound, exemplified by NaF, during the liquid phase reaction.

By employing the liquid phase co-precipitation process, as described above, it is possible to manufacture a II–VI group semiconductor, with a grain size of 2 to 5 nm, doped with an activator. The II–VI group semiconductor, doped with the activator, exhibits the quantum size effect of confining excitors and electron-positive hole pairs within a range of several nm to exhibit a wide band gap. Thus, a light emitting substance improved in light absorption and light emission characteristics may be produced.

In carrying out the liquid phase co-precipitation process, an organic acid is preferably added to the reaction system. The organic acid used may be enumerated by acrylic acid or methacrylic acid.

The organic acid, added during the liquid phase reaction, is polymerized to yield a high-molecular organic acid which is combined with a II–VI group semiconductor in the light emitting substance. That is, in the above example, the organic acid is polymerized to yield a high molecular organic acid which is combined with zinc sulfide. If, for example, acrylic acid is used as an organic acid, the following reaction:

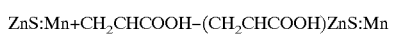

takes place.

By adding an organic acid at the time of the liquid phase reaction, the activator can be uniformly dispersed in the II–VI group semiconductor. That is, by adding an organic acid during the liquid phase reaction, the light emitting substance can be manufactured in such a manner that the molecules of the activator doped into the II–VI group semiconductor will be independent of one another and dispersed uniformly therein.

With the light emitting substance, produced in this manner, since the energy from the excited activator operates satisfactorily, the light emitting substance can be produced in which the light emission strength can be improved and strong light emission is displayed even at a low voltage.

The added organic acid undergoes polymerization to produce a high molecular material which then is chemically combined with the II–VI group semiconductor. The result is that, with the produced light emitting substance, part of the energy required for light emission is furnished from the organic acid, now turned into a high molecular material, thus further improving the light emission strength.

The organic acid itself, added during the liquid phase reaction and thereby turned into a high molecular material, exhibits light emission characteristics, so that the produced light emitting substance exhibits light emission properties ascribable to the organic acid turned into the high molecular material, in addition to emission properties ascribable to the activator.

Alternatively, the high molecular organic acid or polystyrene may be added after the end of the liquid phase reaction, instead of adding the organic acid or polystyrene after the end of the liquid phase reaction. The high-molecular organic acid may be enumerated by polyacrylic acid and polymethacrylic acid.

As the method for adding the high-molecular organic acid or polystyrene, there may be recited a method consisting in drying and subsequently molding a reaction product from the liquid phase reaction and dripping the high-molecular organic acid or polystyrene on the molded product.

By adding the high-molecular organic acid or polystyrene in this manner after the end of the liquid phase reaction, the surface of the particles of the II–VI group semiconductor doped with the activator is coated with a high molecular organic acid or polystyrene. The high-molecular organic acid or polystyrene in this case diminishes the defects on the particle surface to decrease non-radiation relaxation. In addition, light emission strength is improved by the same reason as that explained previously in connection with the case of addition of the organic acid. The result is that a light emitting substance can again be produced which is improved in light emission characteristics.

According to the present invention, ultra-violet light is illuminated on the nanocrystal light emitting substance synthesized by the above-described technique.

The wavelength of the illuminated ultraviolet light is preferably 300 to 380 nm. In the case of the zinc sulfide nanocrystal light emitting substance, doped with Mn, for example, the optimum wavelength is 350 nm.

The preferred illumination time, which varies with, for example, an output of the UV light illumination device, is 7 hours or more, in the case of the UV light illumination device having an output of 150 W.

EXAMPLE

A specified Example of the present invention is now explained based on experimental results.

In the present Example, zinc sulfide (ZnS) was used as a II–VI group semiconductor and manganese (Mn) was used as an activator. In this case, manganese is doped in zinc sulfide as a divalent cation. In the following, a method for synthesizing a zinc sulfide nanocrystal light emitting substance (ZnS:Mn) is explained.

First, 150 ml of a methanol solution of zinc acetate (0.133 mol/l) and 25 ml of a methanolic solution of manganese acetate (0.008 mol/l) were mixed together and stirred for ten minutes with a magnetic stirrer to yield a mixed solution.

To the aqueous solution, 60 ml of sodium sulfide (0.4 mol/l) was added, and the resulting mixture was agitated further vigorously for 15 minutes.

To this mixed solution, 50 ml of acrylic acid or methacrylic acid were added and the resulting mass was stirred vigorously for 15 minutes.

Then, using a centrifugal separator, centrifugation was carried out at 4000 rpm for 20 minutes to give a centrifuged precipitate which then was dried by blowing air thereto at 50° C. for 24 hours. The resulting solid product, obtained on drying, was pulverized to produce ZnS:Mn.

In the above-described synthesis method, the methanolic solution of manganese acetate is preferably added in an amount range from 12.5 ml to 125 ml. That is, Mn is preferably added in an amount range from 0.5 mol % to 5 mol % to 1 mol of ZnS:Mn, with the amount of addition of Mn of 1 mol being most preferred.

On the other hand, acrylic acid is preferably added in an amount range from 0.14 mol to 1.4 mol, with the preferred amount being 0.7 mol (50 ml).

For measuring light emission characteristics of the ZnS:Mn nanocrystal light emitting substance, thus synthesized, its photoluminescence strength (PL strength) was measured. For comparison, a sample not added to with an organic acid and a sample added to with methyl methacrylate instead of with the organic acid were prepared, and measurement was made of the PL strength of these samples. The results are shown in FIG. 1, in which the ordinate and the abscissa denote the PL strength and the wavelength, respectively.

As may be seen from FIG. 1, significant peaks are observed at approximately 580 nm in case of samples added to with acrylic acid or methacrylic acid as compared to the non-added sample. Conversely, there is observed no significant peak in the vicinity of 580 nm with a sample added to with methyl methacrylate. This peak in the vicinity of 580 nm demonstrates light emission ascribable to Mn ions. Thus, it has been shown that addition of an organic acid during the liquid phase reaction leads to improved light emission strength ascribable to Mn ions.

The nanocrystal light emitting substance, thus synthesized, exhibits a peak in the vicinity of 430 nm, although this peak is not shown in FIG. 1. This may be demonstrated by the increased PL strength observed in the vicinity of 450 nm shown in FIG. 1. This peak in the vicinity of 430 nm is retained to be that ascribable to acrylic acid. Specifically, light emission at approximately 430 nm is observed presumably due to polyacrylic acid formed on polymerization of the added acrylic acid. Our further researches have demonstrated that organic acids per se, of which polyacrylic acid is to be stated first, exhibit light emitting characteristics at approximately 430 nm. This fact testifies to usefulness of the organic acid, such as polyacrylic acid, in increasing the light emission strength of the entire light emitting substance.

The light emitting substance, prepared as described above, exhibits light emission characteristics at approximately 430 nm, in addition to those at approximately 580 nm. Therefore, this light emitting substance exhibits significant light emission strength on the whole. It is noted that these light emission characteristics are observed not only if acrylic acid is used as the organic acid, but also if other organic acids, such as methacrylic acid, are used. If methacrylic acid is used, polymethacrylic acid is yielded, such that, due to this polymethacrylic acid, light emission is observed in the vicinity of 430 nm.

Figure 2:
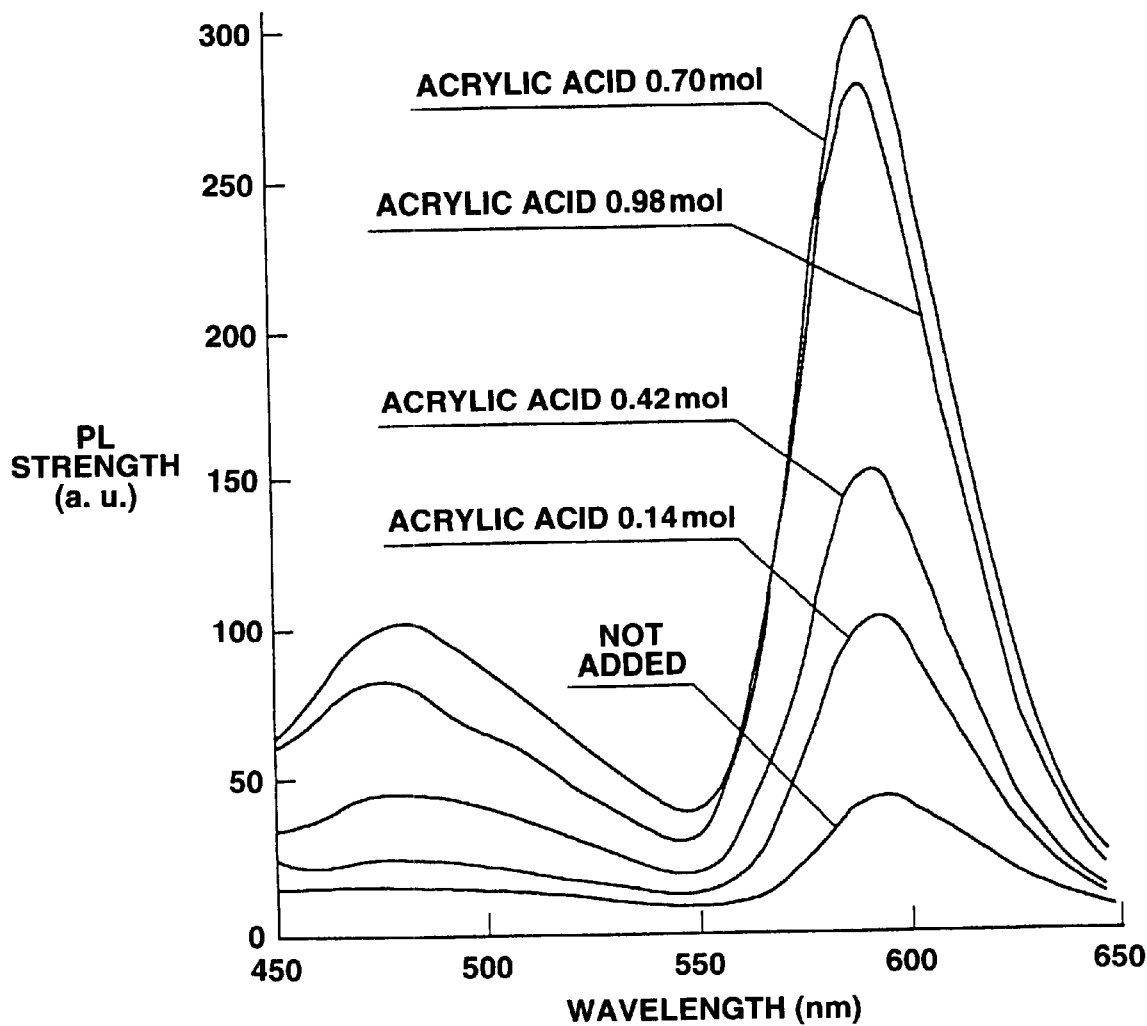
FIG. 2 is a graph showing the relation between the amount of addition of an organic acid and the light emitting strength.

It has also been shown that, with the nanocrystal light emitting substance, prepared by the above-described technique, is changed in its light emission strength in the vicinity of 580 nm ascribable to Mn ions with the amount of addition of the organic acid, as shown in FIG. 2, in which the ordinate and the abscissa denote the PL strength and the wavelength, respectively. It is noted that, in FIG. 2, the amount of addition of acrylic acid is a value of the concentration of the added Mn ions of 1.0 mol %. If, when Mn ions is added in an amount of 1.0 mol %, the amount of addition of acrylic acid is on the order of approximately 0.70 mol %, the light emission strength at approximately 580 nm, ascribable to Mn ions, is approximately ten times that in case of non-addition of acrylic acid.

Although not shown in FIG. 2, the light emission strength in the vicinity of 430 nm ascribable to the organic acid is changed with the amount of addition of the organic acid, as may be seen from the differential increase in the light emission strength observed in the vicinity of 450 nm shown in FIG. 2. Specifically, the light emission strength at 430 nm is increased when the amount of addition of acrylic acid is 0.7 mol. This indicates that, if Mn ions are added in an amount of 1.0 mol %, and the amount of addition of acrylic acid is approximately 0.70 mol, desirably the light emission strength of the entire light emission strength may be increased.

Figure 3:
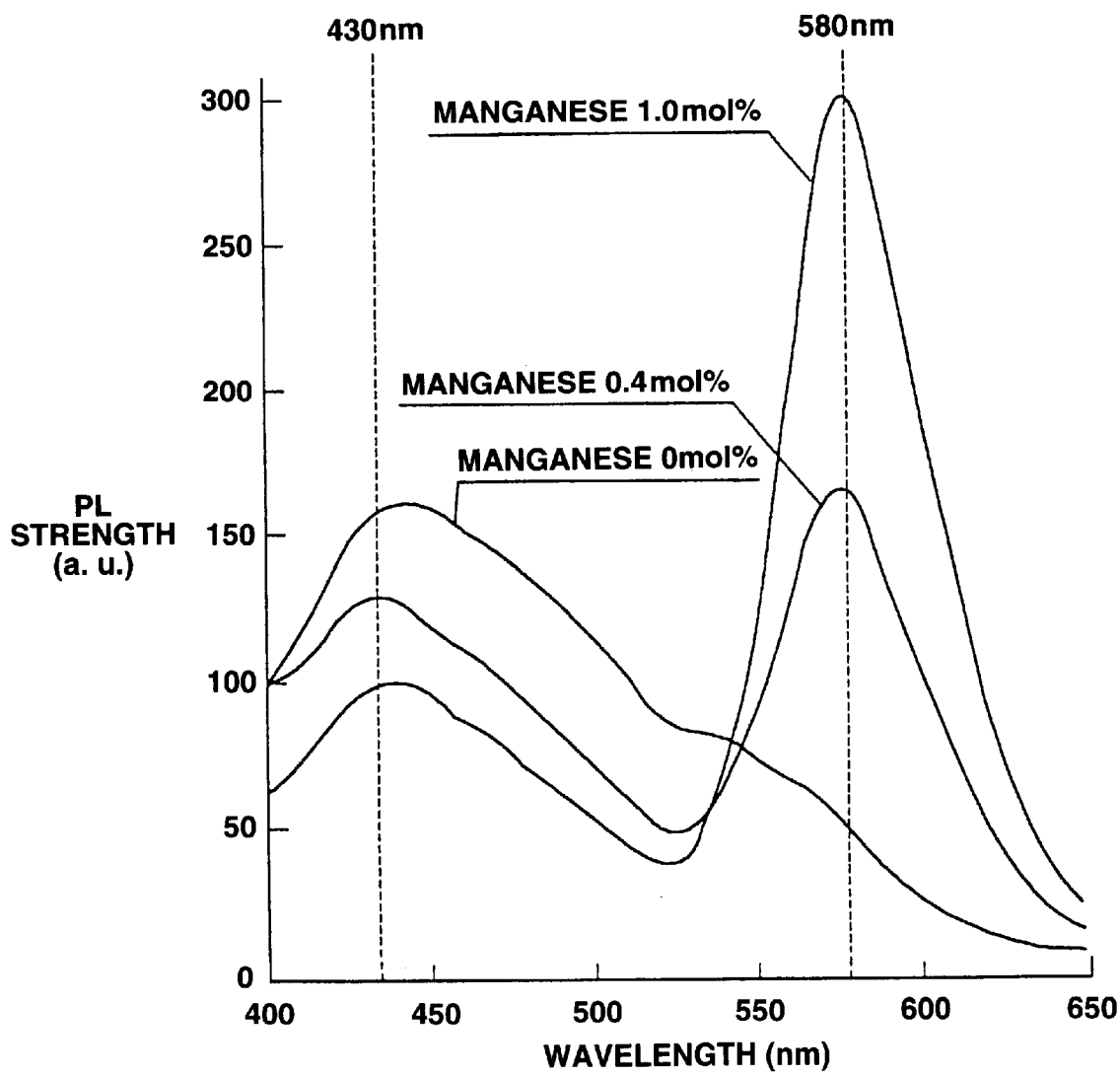
FIG. 3 is a graph showing the relation between the amount of addition of an activator and light emitting characteristics.

Also, the light emission substance, synthesized by the above-described technique, is changed in its light emission strength depending on the concentration of Mn ions, as may be seen from FIG. 3, in which the ordinate and the abscissa denote the PL strength and the wavelength, respectively. It is noted that, in respective samples, shown in FIG. 3, 0.7 mol of acrylic acid is added as an organic acid. As may be seen from FIG. 3, the light emission strength at approximately 580 nm ascribable to Mn ions is increased with the increased Mn ion concentration, while that in the vicinity of 430 nm ascribable to the organic acid is decreased with the increased Mn ion concentration.

This suggests that, in this light emission substance, the energy for light emission is shifted from the organic acid to the Mn ions.

That is, if the doping quantity of the Mn ions is increased, the organic acid furnishes the energy necessary to emit the increased amount of the Mn ions to the Mn ions. The result is that the energy that can be used for light emission of the organic acid is decreased to decrease the light emission in the vicinity of 430 nm, so that the light emission strength in the vicinity of 430 nm ascribable to the organic acid is decreased with the increased doping quantity of the Mn ions.

Also, measurement of the IR absorption spectrum of the above-mentioned light emission substance demonstrated a peak of oscillations due to the organic acid and a peak ascribable to the S—O linkage. This suggests that, in the synthesized light emission substance, the added organic acid is linked to ZnS:Mn via S—O linkage. From this, it may be surmised that the organic acid furnishes the energy for light emission of the Mn ions.

Figure 4:
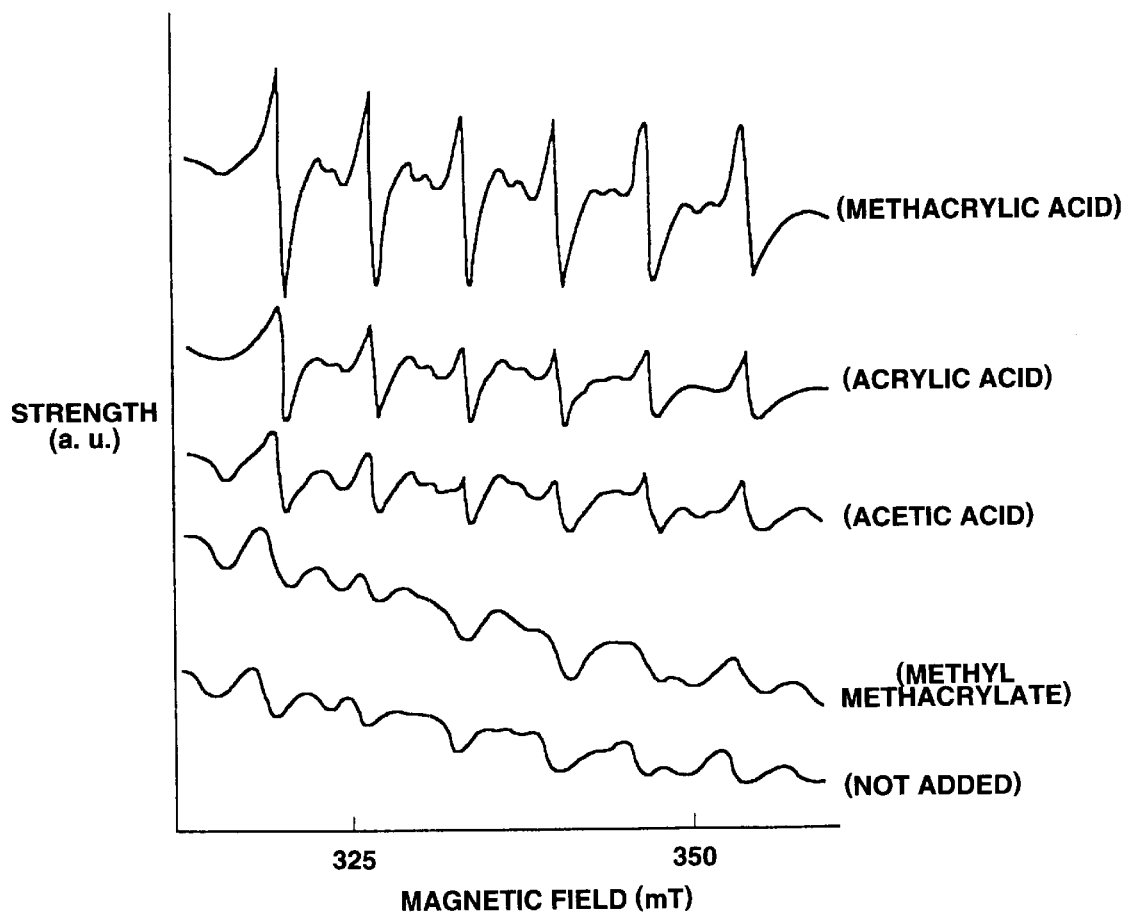
FIG. 4 is a graph showing the state of distribution of an activator on addition of an organic acid.

In the ZnS:Mn, prepared as described above, the state of distribution of the Mn ions was also measured by an electron spin resonance method. The measured results are shown in FIG. 4, in which the ordinate and the abscissa denote the strength and the magnetic field, respectively. For comparison sake, a sample added to with acetic acid, as an organic acid, instead of with acrylic acid or methacrylic acid, a sample added to with methyl methacrylate and a non-addition sample were: here prepared.

As may be seen from FIG. 4, six sharp peaks are observed for the sample added to with acrylic or methacrylic acid, while less sharp six peaks are observed for the sample added to with acetic acid. On the other hand, no sharp peaks are observed for the sample added to with methyl methacrylate or non-addition sample, but only broad peaks are observed.

The reason only the broad peaks are observed in case of addition of acrylic or methacrylic acid in the measured results with the electron spin method is presumably that, since the Mn ions are not doped in a uniformly dispersed state, the spin exchange interaction is displayed. On the other hand, the reason the six sharp peaks are observed as described above is presumably that the Mn ions are doped in the uniformly dispersed state and hence the spin exchange interaction is not displayed.

It has now been shown that addition of the organic acid during the liquid phase reaction leads to the doping of Mn ions in the uniformly dispersed state. It may also be seen that, since the six sharp peaks become sharper if the organic acid is acrylic or Ad methacrylic acid, the Mn ions can then be doped in a more uniformly dispersed state.

If, in this ZnS:Mn, the Mn ions are dispersed uniformly into ZnS and doped therein in this state, the energy of the excited Mn ions is utilized efficiently for light emission. Conversely, should there be a portion in ZnS:Mn in which the Mn ions are doped in an aggregated state, without becoming dispersed uniformly, the light emission strength is lowered. The reason is that the energy of the excited Mn ions is used for exciting the Mn ions in the aggregated state, thus decreasing the energy used for light emission.

Thus, with ZnS:Mn added to with an organic acid during synthesis, the Mn ions can be doped in a uniformly dispersed state, the energy of the excited ions can be efficiently used for light emission without loss of the excited Mn ions.

In the ZnS:Mn, synthesized as described above, the size of the crystal grains was analyzed over an electron microscope on the basis of the spreading of the X-ray diffraction peak. It was found that the crystal grain size was on the order of 2 to 3 nm. If, in this technique, the amount of addition of acrylic or methacrylic acid is changed, the crystal grain size can be adjusted. Thus, in the case of addition of methacrylic acid, the amount of addition of methacrylic acid is 10 ml, 30 ml or 50 ml, the crystal grain size is approximately 2.7 nm, 2.5 nm or 2.3 nm, respectively.

According to the present invention, the zinc sulfide nanocrystal light emission substance, synthesized as described above, is further processed with UV ray irradiation.

Specifically, zinc sulfide nanocrystal, synthesized on addition of acrylic acid by the above technique as a solid and further pulverized, was actually irradiated with the UV light.

Figure 5:
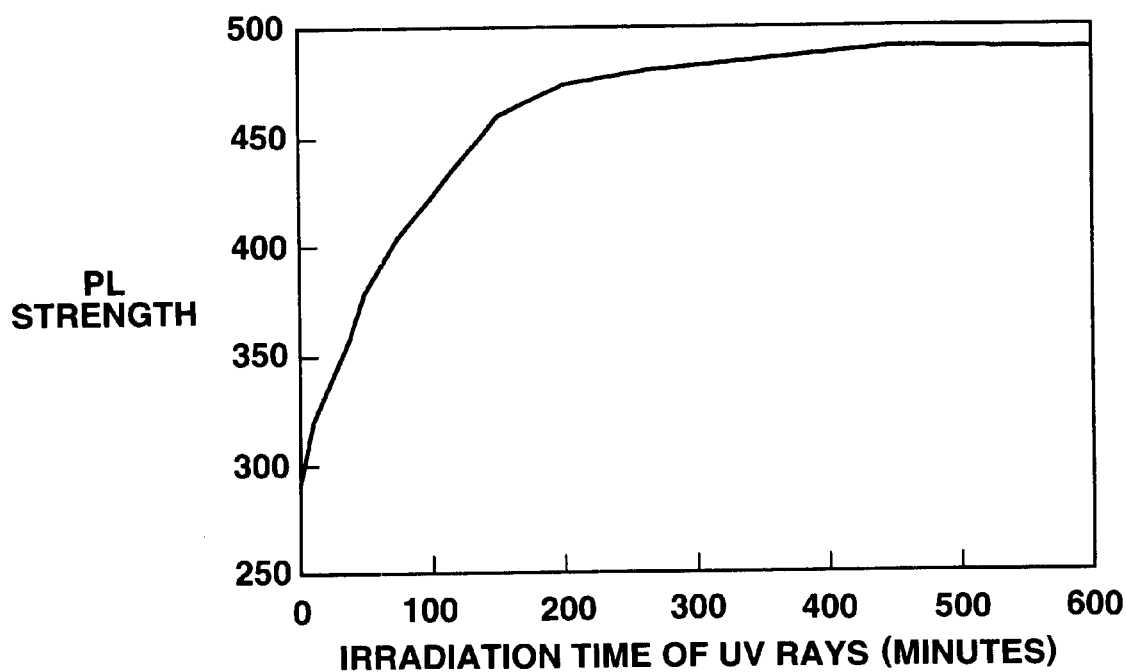
FIG. 5 is a graph showing the relation between the irradiation time of the ultraviolet light and the PL strength.

FIG. 5 shows changes in the PL strength against the UV light irradiation time. Meanwhile, a UV light illumination device used was of an output of 150 W.

It is seen from FIG. 5 that, the longer the UV light irradiation time, the stronger becomes the PL strength. Thus, with use of the present device, the UV light irradiation time (curing time) is preferably set to 7 hours or longer. The wavelength of the UV light used is preferably 300 to 380 nm, with the optimum wavelength being 350 nm.

After irradiation continuing for seven hours, the PL strength (light emission of $Mn^{2+}$ from $^4T_1$ to $^6A_1$) is improved to approximately 1.6 times that prior to UV light irradiation or even higher. This is presumably due to the fact that polyacrylic acid generated on drying is further polymerized due to UV light illumination to hide the defect and that energy shift from polyacrylic acid to $Mn^{2+}$ is further increased to contribute to the improved light emission efficiency.

What is claimed is:

1. A method for manufacturing a light-emitting material, comprising:

forming a II–VI group semiconductor, doped with an activator, by a liquid phase reaction having a co-precipitation product;

adding an ultraviolet light polymerizable organic acid to the liquid phase reaction system during the liquid phase reaction or after the liquid-phase reaction;

polymerizing the organic acid to form a resulting composition; and curing the composition with ultraviolet light.

2. The method of claim 1 wherein the activator is selected from the group consisting of one or more of manganese, copper, aluminum, silver, chlorine, terbium, thulium, europium, and fluorine.

3. The method of claim 1 wherein, in the liquid phase co-precipitation process, manganese acetate and zinc acetate are reacted along with sodium sulfide in a solvent for forming zinc sulfide doped with manganese.

4. The method of claim 1 wherein the curing comprises using an ultraviolet light illumination device with an output of 150 watts.

5. The method of claim 1 wherein the curing occurs for seven hours or longer.

6. The method of claim 1 wherein the ultraviolet light has a wavelength between 300 and 380 nm.

7. The method of claim 16 wherein the ultraviolet light has a wavelength of 350 nm.

* * * * *